US010670879B2

(12) United States Patent
Goldenberg et al.

(10) Patent No.: US 10,670,879 B2
(45) Date of Patent: Jun. 2, 2020

(54) BI-DIRECTIONAL STIFFNESS FOR OPTICAL IMAGE STABILIZATION IN A DUAL-APERTURE DIGITAL CAMERA

(71) Applicant: Corephotonics Ltd., Tel-Aviv (IL)

(72) Inventors: Ephraim Robert Goldenberg, Ashdod (IL); Gal Shabtay, Tel Aviv (IL); Gal Avivi, Haifa (IL); Itay Jerby, Netanya (IL); Michael Dror, Nes Ziona (IL); Gil Bachar, Tel Aviv (IL); Itay Yedid, Karme Yosef (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 16/285,953

(22) Filed: Feb. 26, 2019

(65) Prior Publication Data
US 2019/0187486 A1 Jun. 20, 2019

Related U.S. Application Data

(63) Continuation of application No. 16/017,144, filed on Jun. 25, 2018, which is a continuation of application
(Continued)

(51) Int. Cl.
*G02B 27/64* (2006.01)
*G02B 7/04* (2006.01)
(Continued)

(52) U.S. Cl.
CPC .............. *G02B 27/64* (2013.01); *G02B 7/04* (2013.01); *G02B 7/08* (2013.01); *G02B 7/09* (2013.01);
(Continued)

(58) Field of Classification Search
None
See application file for complete search history.

(56) References Cited

U.S. PATENT DOCUMENTS

| 4,199,785 A | 4/1980 | McCullough et al. |
| 4,679,904 A * | 7/1987 | Kurihara ............ G11B 7/0932 359/824 |

(Continued)

FOREIGN PATENT DOCUMENTS

| EP | 1780567 A1 | 5/2007 |
| EP | 2523450 A1 | 11/2012 |

(Continued)

OTHER PUBLICATIONS

Statistical Modeling and Performance Characterization of a Real-Time Dual Camera Surveillance System, Greienhagen et al., Publisher: IEEE, 2000, 8 pages.
(Continued)

*Primary Examiner* — Derek S. Chapel
(74) *Attorney, Agent, or Firm* — Nathan & Associates; Menachem Nathan

(57) ABSTRACT

Mechanisms for providing optical image stabilization in at least one direction as well as auto-focus in a digital camera comprise a plurality of springs mechanically coupled to at least a lens module carrying a lens of the digital camera, wherein the plurality of springs provides overall low stiffness to movement of the lens in two, first and second directions orthogonal to each other, and provides high stiffness to torsion of the lens module.

15 Claims, 10 Drawing Sheets

Related U.S. Application Data

No. 15/310,887, filed as application No. PCT/IB2016/053026 on May 24, 2016, now Pat. No. 10,036,895.

(60) Provisional application No. 62/167,571, filed on May 28, 2015.

(51) Int. Cl.
  *G02B 7/09* (2006.01)
  *H04N 5/225* (2006.01)
  *G02B 7/08* (2006.01)

(52) U.S. Cl.
  CPC ......... *G02B 27/646* (2013.01); *H04N 5/2254* (2013.01); *H04N 5/2257* (2013.01); *H04N 5/2258* (2013.01)

(56) References Cited

U.S. PATENT DOCUMENTS

| | | |
|---|---|---|
| 5,005,083 A | 4/1991 | Grage et al. |
| 5,032,917 A | 7/1991 | Aschwanden |
| 5,041,852 A | 8/1991 | Misawa et al. |
| 5,051,830 A | 9/1991 | von Hoessle |
| 5,099,263 A | 3/1992 | Matsumoto et al. |
| 5,248,971 A | 9/1993 | Mandl |
| 5,287,093 A | 2/1994 | Amano et al. |
| 5,394,520 A | 2/1995 | Hall |
| 5,436,660 A | 7/1995 | Sakamoto |
| 5,444,478 A | 8/1995 | Lelong et al. |
| 5,459,520 A | 10/1995 | Sasaki |
| 5,657,402 A | 8/1997 | Bender et al. |
| 5,682,198 A | 10/1997 | Katayama et al. |
| 5,768,443 A | 6/1998 | Michael et al. |
| 5,926,190 A | 7/1999 | Turkowski et al. |
| 5,940,641 A | 8/1999 | McIntyre et al. |
| 5,982,951 A | 11/1999 | Katayama et al. |
| 6,101,334 A | 8/2000 | Fantone |
| 6,128,416 A | 10/2000 | Oura |
| 6,148,120 A | 11/2000 | Sussman |
| 6,208,765 B1 | 3/2001 | Bergen |
| 6,268,611 B1 | 7/2001 | Pettersson et al. |
| 6,549,215 B2 | 4/2003 | Jouppi |
| 6,611,289 B1 | 8/2003 | Yu et al. |
| 6,643,416 B1 | 11/2003 | Daniels et al. |
| 6,650,368 B1 | 11/2003 | Doron |
| 6,680,748 B1 | 1/2004 | Monti |
| 6,714,665 B1 | 3/2004 | Hanna et al. |
| 6,724,421 B1 | 4/2004 | Glatt |
| 6,738,073 B2 | 5/2004 | Park et al. |
| 6,741,250 B1 | 5/2004 | Furlan et al. |
| 6,750,903 B1 | 6/2004 | Miyatake et al. |
| 6,778,207 B1 | 8/2004 | Lee et al. |
| 7,002,583 B2 | 2/2006 | Rabb, III |
| 7,015,954 B1 | 3/2006 | Foote et al. |
| 7,038,716 B2 | 5/2006 | Klein et al. |
| 7,199,348 B2 | 4/2007 | Olsen et al. |
| 7,206,136 B2 | 4/2007 | Labaziewicz et al. |
| 7,248,294 B2 | 7/2007 | Slatter |
| 7,256,944 B2 | 8/2007 | Labaziewicz et al. |
| 7,305,180 B2 | 12/2007 | Labaziewicz et al. |
| 7,339,621 B2 | 3/2008 | Fortier |
| 7,346,217 B1 | 3/2008 | Gold, Jr. |
| 7,365,793 B2 | 4/2008 | Cheatle et al. |
| 7,411,610 B2 | 8/2008 | Doyle |
| 7,424,218 B2 | 9/2008 | Baudisch et al. |
| 7,509,041 B2 | 3/2009 | Hosono |
| 7,533,819 B2 | 5/2009 | Barkan et al. |
| 7,619,683 B2 | 11/2009 | Davis |
| 7,738,016 B2 | 6/2010 | Toyofuku |
| 7,773,121 B1 | 8/2010 | Huntsberger et al. |
| 7,809,256 B2 | 10/2010 | Kuroda et al. |
| 7,880,776 B2 | 2/2011 | LeGall et al. |
| 7,918,398 B2 | 4/2011 | Li et al. |
| 7,964,835 B2 | 6/2011 | Olsen et al. |
| 7,978,239 B2 | 7/2011 | Deever et al. |
| 8,115,825 B2 | 2/2012 | Culbert et al. |
| 8,149,327 B2 | 4/2012 | Lin et al. |
| 8,154,610 B2 | 4/2012 | Jo et al. |
| 8,238,695 B1 | 8/2012 | Davey et al. |
| 8,274,552 B2 | 9/2012 | Dahi et al. |
| 8,390,729 B2 | 3/2013 | Long et al. |
| 8,391,697 B2 | 3/2013 | Cho et al. |
| 8,400,555 B1 | 3/2013 | Georgiev et al. |
| 8,439,265 B2 | 5/2013 | Ferren et al. |
| 8,446,484 B2 | 5/2013 | Muukki et al. |
| 8,483,452 B2 | 7/2013 | Ueda et al. |
| 8,514,491 B2 | 8/2013 | Duparre |
| 8,547,389 B2 | 10/2013 | Hoppe et al. |
| 8,553,106 B2 | 10/2013 | Scarff |
| 8,587,691 B2 | 11/2013 | Takane |
| 8,619,148 B1 | 12/2013 | Watts et al. |
| 8,803,990 B2 | 8/2014 | Smith |
| 8,896,655 B2 | 11/2014 | Mauchly et al. |
| 8,976,255 B2 | 3/2015 | Matsuoto et al. |
| 9,019,387 B2 | 4/2015 | Nakano |
| 9,025,073 B2 | 5/2015 | Attar et al. |
| 9,025,077 B2 | 5/2015 | Attar et al. |
| 9,041,835 B2 | 5/2015 | Honda |
| 9,137,447 B2 | 9/2015 | Shibuno |
| 9,185,291 B1 | 11/2015 | Shabtay et al. |
| 9,215,377 B2 | 12/2015 | Sokeila et al. |
| 9,215,385 B2 | 12/2015 | Luo |
| 9,270,875 B2 | 2/2016 | Brisedoux et al. |
| 9,286,680 B1 | 3/2016 | Jiang et al. |
| 9,344,626 B2 | 5/2016 | Silverstein et al. |
| 9,360,671 B1 | 6/2016 | Zhou |
| 9,369,621 B2 | 6/2016 | Malone et al. |
| 9,413,930 B2 | 8/2016 | Geerds |
| 9,413,984 B2 | 8/2016 | Attar et al. |
| 9,420,180 B2 | 8/2016 | Jin |
| 9,438,792 B2 | 9/2016 | Nakada et al. |
| 9,485,432 B1 | 11/2016 | Medasani et al. |
| 9,578,257 B2 | 2/2017 | Attar et al. |
| 9,618,748 B2 | 4/2017 | Munger et al. |
| 9,681,057 B2 | 6/2017 | Attar et al. |
| 9,723,220 B2 | 8/2017 | Sugie |
| 9,736,365 B2 | 8/2017 | Laroia |
| 9,736,391 B2 | 8/2017 | Du et al. |
| 9,768,310 B2 | 9/2017 | Ahn et al. |
| 9,800,798 B2 | 10/2017 | Ravirala et al. |
| 9,851,803 B2 | 12/2017 | Fisher et al. |
| 9,894,287 B2 | 2/2018 | Qian et al. |
| 9,900,522 B2 | 2/2018 | Lu |
| 9,927,600 B2 | 3/2018 | Goldenberg et al. |
| 2002/0005902 A1 | 1/2002 | Yuen |
| 2002/0030163 A1 | 3/2002 | Zhang |
| 2002/0063711 A1 | 5/2002 | Park et al. |
| 2002/0075258 A1 | 6/2002 | Park et al. |
| 2002/0122113 A1 | 9/2002 | Foote |
| 2002/0163581 A1* | 11/2002 | Kitazawa ........... H04N 5/23248 348/208.6 |
| 2002/0167741 A1 | 11/2002 | Koiwai et al. |
| 2003/0030729 A1 | 2/2003 | Prentice et al. |
| 2003/0093805 A1 | 5/2003 | Gin |
| 2003/0160886 A1 | 8/2003 | Misawa et al. |
| 2003/0202113 A1 | 10/2003 | Yoshikawa |
| 2004/0008773 A1 | 1/2004 | Itokawa |
| 2004/0012683 A1 | 1/2004 | Yamasaki et al. |
| 2004/0017386 A1 | 1/2004 | Liu et al. |
| 2004/0027367 A1 | 2/2004 | Pilu |
| 2004/0061788 A1 | 4/2004 | Bateman |
| 2004/0141086 A1 | 7/2004 | Mihara |
| 2004/0240052 A1 | 12/2004 | Minefuji et al. |
| 2005/0013509 A1 | 1/2005 | Samadani |
| 2005/0046740 A1 | 3/2005 | Davis |
| 2005/0110873 A1* | 5/2005 | Enomoto ............. G02B 27/646 348/207.99 |
| 2005/0157184 A1 | 7/2005 | Nakanishi et al. |
| 2005/0168834 A1 | 8/2005 | Matsumoto et al. |
| 2005/0200718 A1 | 9/2005 | Lee |
| 2006/0054782 A1 | 3/2006 | Olsen et al. |
| 2006/0056056 A1 | 3/2006 | Ahiska et al. |

(56) References Cited

U.S. PATENT DOCUMENTS

| | | |
|---|---|---|
| 2006/0102907 A1 | 5/2006 | Lee et al. |
| 2006/0125937 A1 | 6/2006 | LeGall et al. |
| 2006/0170793 A1 | 8/2006 | Pasquarette et al. |
| 2006/0175549 A1 | 8/2006 | Miller et al. |
| 2006/0187310 A1 | 8/2006 | Janson et al. |
| 2006/0187322 A1 | 8/2006 | Janson et al. |
| 2006/0187338 A1 | 8/2006 | May et al. |
| 2007/0024737 A1 | 2/2007 | Nakamura et al. |
| 2007/0126911 A1 | 6/2007 | Nanjo |
| 2007/0177025 A1 | 8/2007 | Kopet et al. |
| 2007/0188653 A1 | 8/2007 | Pollock et al. |
| 2007/0189386 A1 | 8/2007 | Imagawa et al. |
| 2007/0257184 A1 | 11/2007 | Olsen et al. |
| 2007/0285550 A1 | 12/2007 | Son |
| 2008/0017557 A1 | 1/2008 | Witdouck |
| 2008/0024614 A1 | 1/2008 | Li et al. |
| 2008/0025634 A1 | 1/2008 | Border et al. |
| 2008/0030592 A1 | 2/2008 | Border et al. |
| 2008/0030611 A1 | 2/2008 | Jenkins |
| 2008/0084484 A1 | 4/2008 | Ochi et al. |
| 2008/0117316 A1 | 5/2008 | Orimoto |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2009/0086074 A1 | 4/2009 | Li et al. |
| 2009/0109556 A1 | 4/2009 | Shimizu et al. |
| 2009/0122195 A1 | 5/2009 | Van Baar et al. |
| 2009/0122406 A1 | 5/2009 | Rouvinen et al. |
| 2009/0128644 A1 | 5/2009 | Camp et al. |
| 2009/0219547 A1 | 9/2009 | Kauhanen et al. |
| 2009/0252484 A1 | 10/2009 | Hasuda et al. |
| 2009/0295949 A1 | 12/2009 | Ojala |
| 2009/0324135 A1 | 12/2009 | Kondo et al. |
| 2010/0013906 A1 | 1/2010 | Border et al. |
| 2010/0020221 A1 | 1/2010 | Tupman et al. |
| 2010/0060746 A9 | 3/2010 | Olsen et al. |
| 2010/0097444 A1 | 4/2010 | Lablans |
| 2010/0103194 A1 | 4/2010 | Chen et al. |
| 2010/0165131 A1* | 7/2010 | Makimoto ........... G02B 27/646 348/208.7 |
| 2010/0238327 A1 | 9/2010 | Griffith et al. |
| 2010/0283842 A1 | 11/2010 | Guissin et al. |
| 2010/0321494 A1 | 12/2010 | Peterson et al. |
| 2011/0058320 A1 | 3/2011 | Kim et al. |
| 2011/0064327 A1 | 3/2011 | Dagher et al. |
| 2011/0080487 A1 | 4/2011 | Venkataraman et al. |
| 2011/0128288 A1 | 6/2011 | Petrou et al. |
| 2011/0164172 A1 | 7/2011 | Shintani et al. |
| 2011/0229054 A1 | 9/2011 | Weston et al. |
| 2011/0234853 A1 | 9/2011 | Hayashi et al. |
| 2011/0234881 A1 | 9/2011 | Wakabayashi et al. |
| 2011/0242286 A1 | 10/2011 | Pace et al. |
| 2011/0242355 A1 | 10/2011 | Goma et al. |
| 2011/0298966 A1 | 12/2011 | Kirschstein et al. |
| 2012/0026366 A1 | 2/2012 | Golan et al. |
| 2012/0062780 A1 | 3/2012 | Morihisa |
| 2012/0069235 A1 | 3/2012 | Imai |
| 2012/0075489 A1 | 3/2012 | Nishihara |
| 2012/0105579 A1 | 5/2012 | Jeon et al. |
| 2012/0154614 A1 | 6/2012 | Moriya et al. |
| 2012/0196648 A1 | 8/2012 | Havens et al. |
| 2012/0229663 A1 | 9/2012 | Nelson et al. |
| 2012/0249815 A1 | 10/2012 | Bohn et al. |
| 2012/0287315 A1 | 11/2012 | Huang et al. |
| 2012/0320467 A1 | 12/2012 | Baik et al. |
| 2013/0002928 A1 | 1/2013 | Imai |
| 2013/0016427 A1 | 1/2013 | Sugawara |
| 2013/0076922 A1 | 3/2013 | Shihoh et al. |
| 2013/0093842 A1 | 4/2013 | Yahata |
| 2013/0113894 A1 | 5/2013 | Mirlay |
| 2013/0135445 A1 | 5/2013 | Dahi et al. |
| 2013/0182150 A1 | 7/2013 | Asakura |
| 2013/0201360 A1 | 8/2013 | Song |
| 2013/0202273 A1 | 8/2013 | Ouedraogo et al. |
| 2013/0235224 A1 | 9/2013 | Park et al. |
| 2013/0250150 A1 | 9/2013 | Malone et al. |
| 2013/0258044 A1 | 10/2013 | Betts-LaCroix |
| 2013/0270419 A1 | 10/2013 | Singh et al. |
| 2013/0278785 A1 | 10/2013 | Nomura et al. |
| 2013/0321668 A1 | 12/2013 | Kamath |
| 2014/0009631 A1 | 1/2014 | Topliss |
| 2014/0049615 A1 | 2/2014 | Uwagawa |
| 2014/0118584 A1 | 5/2014 | Lee et al. |
| 2014/0192238 A1 | 7/2014 | Attar et al. |
| 2014/0192253 A1 | 7/2014 | Laroia |
| 2014/0218587 A1 | 8/2014 | Shah |
| 2014/0313316 A1 | 10/2014 | Olsson et al. |
| 2014/0362242 A1 | 12/2014 | Takizawa |
| 2015/0002683 A1 | 1/2015 | Hu et al. |
| 2015/0042870 A1 | 2/2015 | Chan et al. |
| 2015/0070781 A1 | 3/2015 | Cheng et al. |
| 2015/0092066 A1 | 4/2015 | Geiss et al. |
| 2015/0138381 A1 | 5/2015 | Ahn |
| 2015/0154776 A1 | 6/2015 | Zhang et al. |
| 2015/0162048 A1 | 6/2015 | Hirata et al. |
| 2015/0195458 A1 | 7/2015 | Nakayama et al. |
| 2015/0215516 A1 | 7/2015 | Dolgin |
| 2015/0237280 A1 | 8/2015 | Choi et al. |
| 2015/0242994 A1 | 8/2015 | Shen |
| 2015/0253543 A1 | 9/2015 | Mercado |
| 2015/0253647 A1 | 9/2015 | Mercado |
| 2015/0271471 A1 | 9/2015 | Hsieh et al. |
| 2015/0286033 A1 | 10/2015 | Osborne |
| 2015/0316744 A1 | 11/2015 | Chen |
| 2015/0334309 A1 | 11/2015 | Peng et al. |
| 2016/0044250 A1 | 2/2016 | Shabtay et al. |
| 2016/0070088 A1 | 3/2016 | Koguchi |
| 2016/0154202 A1 | 6/2016 | Wippermann et al. |
| 2016/0154204 A1 | 6/2016 | Lim et al. |
| 2016/0212358 A1 | 7/2016 | Shikata |
| 2016/0241751 A1 | 8/2016 | Park |
| 2016/0291295 A1 | 10/2016 | Shabtay et al. |
| 2016/0295112 A1 | 10/2016 | Georgiev et al. |
| 2016/0301840 A1 | 10/2016 | Du et al. |
| 2016/0353008 A1 | 12/2016 | Osborne |
| 2016/0353012 A1 | 12/2016 | Kao et al. |
| 2017/0019616 A1 | 1/2017 | Zhu et al. |
| 2017/0187962 A1 | 6/2017 | Lee et al. |
| 2017/0214846 A1 | 7/2017 | Du et al. |
| 2017/0214866 A1 | 7/2017 | Zhu et al. |
| 2017/0242225 A1 | 8/2017 | Fiske |
| 2017/0289458 A1 | 10/2017 | Song et al. |
| 2018/0017844 A1 | 1/2018 | Yu et al. |
| 2018/0024329 A1 | 1/2018 | Goldenberg et al. |
| 2018/0059379 A1 | 3/2018 | Chou |
| 2018/0120674 A1 | 5/2018 | Avivi et al. |
| 2018/0150973 A1 | 5/2018 | Tang et al. |
| 2018/0241922 A1 | 8/2018 | Baldwin et al. |
| 2018/0295292 A1 | 10/2018 | Lee et al. |

FOREIGN PATENT DOCUMENTS

| | | |
|---|---|---|
| JP | 2004245982 A | 9/2004 |
| JP | 2011085666 A | 4/2011 |
| WO | 2010122841 A1 | 10/2010 |
| WO | WO-2016166730 A1 * | 10/2016 ............ G02B 13/16 |

OTHER PUBLICATIONS

A 3MPixel Multi-Aperture Image Sensor with 0.7μm Pixels in 0.11μm CMOS, Fife et al., Stanford University, 2008, 3 pages.

Dual camera intelligent sensor for high definition 360 degrees surveillance, Scoth et al., Publisher: IET, May 9, 2000, 8 pages.

Dual-sensor foveated imaging system, Hua et al., Publisher: Optical Society of America, Jan. 14, 2008, 11 pages.

Defocus Video Matting, McGuire et al., Publisher: ACM SIGGRAPH, Jul. 31, 2005, 11 pages.

Compact multi-aperture imaging with high angular resolution, Santacana et al., Publisher: Optical Society of America, 2015, 10 pages.

Multi-Aperture Photography, Green et al., Publisher: Mitsubishi Electric Research Laboratories, Inc., Jul. 2007, 10 pages.

(56) References Cited

OTHER PUBLICATIONS

Multispectral Bilateral Video Fusion, Bennett et al., Publisher: IEEE, May 2007, 10 pages.
Super-resolution imaging using a camera array, Santacana et al., Publisher: Optical Society of America, 2014, 6 pages.
Optical Splitting Trees for High-Precision Monocular Imaging, McGuire et al., Publisher: IEEE, 2007, 11 pages.
High Performance Imaging Using Large Camera Arrays, Wilburn et al., Publisher: Association for Computing Machinery, Inc., 2005, 12 pages.
Real-time Edge-Aware Image Processing with the Bilateral Grid, Chen et al., Publisher: ACM SIGGRAPH, 2007, 9 pages.
Superimposed multi-resolution imaging, Caries et al., Publisher: Optical Society of America, 2017, 13 pages.
Viewfinder Alignment, Adams et al., Publisher: EUROGRAPHICS, 2008, 10 pages.
Dual-Camera System for Multi-Level Activity Recognition, Bodor et al., Publisher: IEEE, Oct. 2014, 6 pages.
Engineered to the task: Why camera-phone cameras are different, Giles Humpston, Publisher: Solid State Technology Jun. 2009, 3 pages.

* cited by examiner (a)          (b)

(a)          (b)

BI-DIRECTIONAL STIFFNESS FOR OPTICAL IMAGE STABILIZATION IN A DUAL-APERTURE DIGITAL CAMERA

CROSS-REFERENCE TO RELATED APPLICATIONS

This application is a continuation application from U.S. patent application Ser. No. 16/017,144 filed Jun. 25, 2018, which was a continuation application from U.S. patent application Ser. No. 15/310,887 filed Nov. 14, 2016 (issued as U.S. Pat. No. 10,036,895), which was a 371 application from international patent application PCT/IB2016/053026, and is related to and claims priority from U.S. Provisional Patent Application No. 62/167,571 filed on May 28, 2015, which is expressly incorporated herein by reference in its entirety.

FIELD

Embodiments disclosed herein relate in general to digital cameras and in particular to optical image stabilization (OIS) and auto-focus (AF) in single and/or dual-aperture ("dual-optical module") digital cameras.

BACKGROUND

In recent years, mobile devices such as cell-phones (and in particular smart-phones), tablets and laptops have become ubiquitous. Most of these devices include one or two compact cameras: a main rear-facing camera (i.e. a camera on the back side of the device, facing away from the user and often used for casual photography) and a secondary front-facing camera (i.e. a camera located on the front side of the device and often used for video conferencing).

Although relatively compact in nature, the design of most of these cameras is very similar to the traditional structure of a digital still camera, i.e. they comprise an optical component (or a train of several optical elements and a main aperture) placed on top of an image sensor. The optical component (also referred to as "optics") refracts the incoming light rays and bends them to create an image of a scene on the sensor. The dimensions of these cameras are largely determined by the size of the sensor and by the height of the optics. These are usually tied together through the focal length ("f") of the lens and its field of view (FOV)—a lens that has to image a certain FOV on a sensor of a certain size has a specific focal length. Keeping the FOV constant, the larger the sensor dimensions (e.g. in a X-Y plane) the larger the focal length and the optics height.

In addition to the optics and sensor, modern cameras usually further include mechanical motion (actuation) mechanism for two main purposes: focusing of the image on the sensor and optical image stabilization (OIS). For focusing, in more advanced cameras, the position of the lens module (or at least one lens element in the lens module) can be changed by means of an actuator and the focus distance can be changed in accordance with the captured object or scene. In these cameras it is possible to capture objects from a very short distance (e.g., 10 cm) to infinity. The trend in digital still cameras is to increase the zooming capabilities (e.g. to 5×, 10× or more) and, in cell-phone (and particularly smart-phone) cameras, to decrease the pixel size and increase the pixel count. These trends result in greater sensitivity to hand-shake or in a need for longer exposure time. An OIS mechanism is required to answer the needs in these trends.

In OIS-enabled cameras, the lens or camera module can change its lateral position or tilt angle in a fast manner to cancel the handshake during the image capture. Handshakes move the camera module in 6 degrees of freedom, namely linear movements in three degrees of freedom (X, Y & Z), pitch (tilt around the X axis), yaw (tilt around the Y axis) and roll (tilt around the Z axis). FIG. 1 shows an exemplary classical four rod-springs (102a-d) OIS structure in a single-aperture camera module 100. The four rod-springs are rigidly connected to an upper frame 104 that usually accommodates an AF actuator (not shown) that moves the lens module 106. This structure allows desired modes of movement in the X-Y plane (translation), FIG. 1a, but also allows a mode of unwanted rotation (also referred to as "θ-rotation" or "torsion") around the Z axis, FIG. 1b. The latter may be due to a combination of several causes such as asymmetric forces applied by the coils or by a user's (or phone) movements, imperfections of the rod-springs and the high rotational compliance of the four spring rod spring+frame structure.

In the case of a centered single-aperture camera module, this rotation does not affect the image quality severely, since the lens is axisymmetric. However, this does affect OIS in a dual-camera module, FIGS. 2a and 2b. FIG. 2a shows a rotation mode around an axis 202 roughly centered between two camera modules 204 and 206 of a dual-aperture camera 200. Because of the location of rotation axis 202, the rotation may cause significant deterioration in the image quality. The rotation causes each lens to shift away in undesired directions (shown by arrows in FIG. 2b), without having any ability to predict when and if this may happen. The result is motion blur of the image and a shift of the two lenses in opposite Y directions caused by the unwanted rotation that results in decenter between images received by each camera module, and therefore potentially in a catastrophic influence on fusion algorithm results.

Yet another problem may occur in a folded optics zoom dual-aperture camera, such as a camera 300 shown in FIG. 3. Such a camera is described for example in detail in co-owned international patent application PCT/IB2016/052179 which is incorporated herein by reference in its entirety. Camera 300 comprises a folded optics camera module 302 and an upright (non-folded) camera module 304. Among other components, folded optics camera module 302 comprises a lens actuation sub-assembly for moving a lens module 306 (and a lens therein, which is referred to henceforth as "folded lens") in the X-Y plane. The lens actuation sub-assembly includes a hanging structure with four flexible hanging members (i.e. the "rod-springs" referred to above) 308 a-d that hang lens module 306 over a base 310. In some embodiments, hanging members 308a-d may be in the form of four wires and may be referred to as "wire springs" or "poles". The hanging structure allows in-plane motion as known in the art and described exemplarily in co-owned U.S. patent application Ser. No. 14/373,490. Exemplarily, a first movement direction 312 of the lens is used to achieve Auto-Focus (AF) and a second movement direction 314 is used to achieve OIS. A third movement, an unwanted rotation 316 of the lens about an axis parallel to the Z axis as described above actually causes an unwanted effect of dynamic tilt of the lens (the lens' optical axis may not be perpendicular to the sensor's surface due to that rotation) and may result in images that are usually sharp on one side and blurry on the other side.

The physical quantities that reflect the tendency of any structure to dynamically behave one way or another are the natural frequency values that characterize each mode of behavior. This is of course also relevant for the hanging structure described above. FIGS. 4(a)-(c) show the simulated behavior of a standard rigid plate supported by four round rod-spring poles. The rigid plate may represent any optical element (such as, for example, a lens). The rod-spring poles have the same rigidity to movement in any direction in the X-Y plane (which is perpendicular to the pole's neutral axis). The figures show the compliance of the structure expressed in terms of a natural frequency ratio for each different movement mode; FIG. 4a refers to X-translation, FIG. 4b refers to Y-translation and FIG. 4c refers to rotation around the Z axis. The arrows show schematically the different movements. The reference bar indicates deformation scale in millimeters. The normalized (relative to the first frequency which in this exemplary case is of 33.6 Hz) natural frequencies for X and Y translations are of the same order (specifically 1 in (a) and 1.1 in (b)), whilst the natural frequency for rotation (c) has a relative value of 1.8, which is also of the same order of the X and Y translations. Thus the ratio between natural frequencies for torsion (rotation around Z) and for X or Y translation is about 1.8. In general, known ratios are no larger than 2. This means that the chance that the torsion mode will arise is almost the same as the chance that the X and Y translation modes will arise. This may cause problems in dual-aperture and/or folded zoom cameras (where it will be expressed as dynamic tilt) as described above.

In view of the above, it would be very difficult to get the desired movement of the lens without an active control loop (having such a control loop is one possible way to overcome the described problems). The unwanted torsion may be reduced significantly by means of electrical control over the force applied by the coils (i.e. by using several coils and controlling them so the resultant torque acts to limit the rotation of the lens within specified acceptable limits). However, the addition of an active control loop to avoid tilt complicates the design and adds to cost. It would be therefore advantageous to have lens actuation sub-assemblies for OIS without an active control loop for rotation/tilt.

SUMMARY

In an exemplary embodiment, there is provided a mechanism for providing optical image stabilization (OIS) in at least one direction in a digital camera, comprising: a plurality of springs mechanically coupled to at least a lens module carrying a lens of the digital camera, wherein the plurality of springs provides overall low stiffness to movement of the lens module 2o in two, first and second directions orthogonal to each other and high stiffness to torsion of the lens module such that a ratio between natural frequencies arising from the high stiffness and the low stiffness is greater than 2.

In an exemplary embodiment, the plurality of springs includes a first plurality of springs with low stiffness in the first direction and high stiffness in the second direction; and a second plurality of springs with high stiffness in the first direction and low stiffness in the second direction.

In an exemplary embodiment, the ratio between natural frequencies arising from the high stiffness and the low stiffness is greater than 3.

In an exemplary embodiment, the ratio between natural frequencies arising from the high stiffness and the low stiffness is greater than 5.

In an exemplary embodiment, the ratio between natural frequencies arising from the high stiffness and the low stiffness is greater than 10.

In an exemplary embodiment, the mechanism is dimensioned to accommodate the lens module without obstructing an optical path passing through the lens.

In an exemplary embodiment, the first plurality includes two pairs of leaf springs and the second plurality includes a pair of cross springs.

In an exemplary embodiment, the first plurality includes a pair of leaf springs and one cross spring and the second plurality includes a pair of cross springs.

In an exemplary embodiment, each of the first and second pluralities includes a pair of cross springs.

In an exemplary embodiment, the digital camera is a dual-optical module camera.

In an exemplary embodiment, the lens is a folded lens.

In an exemplary embodiment, the camera is adapted to perform auto-focus.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein, and should not be considered limiting in any way. Like elements in different drawings may be indicated like numerals.

DETAILED DESCRIPTION

We have determined that lens support structures used for AF and OIS may be designed with support members that have different compliance (stiffness) to movements in different directions of different types of movements. The different compliance in different movement directions or for different movement types may be obtained by non-round or non-square supports cross sections of such support members.

Figure 5:
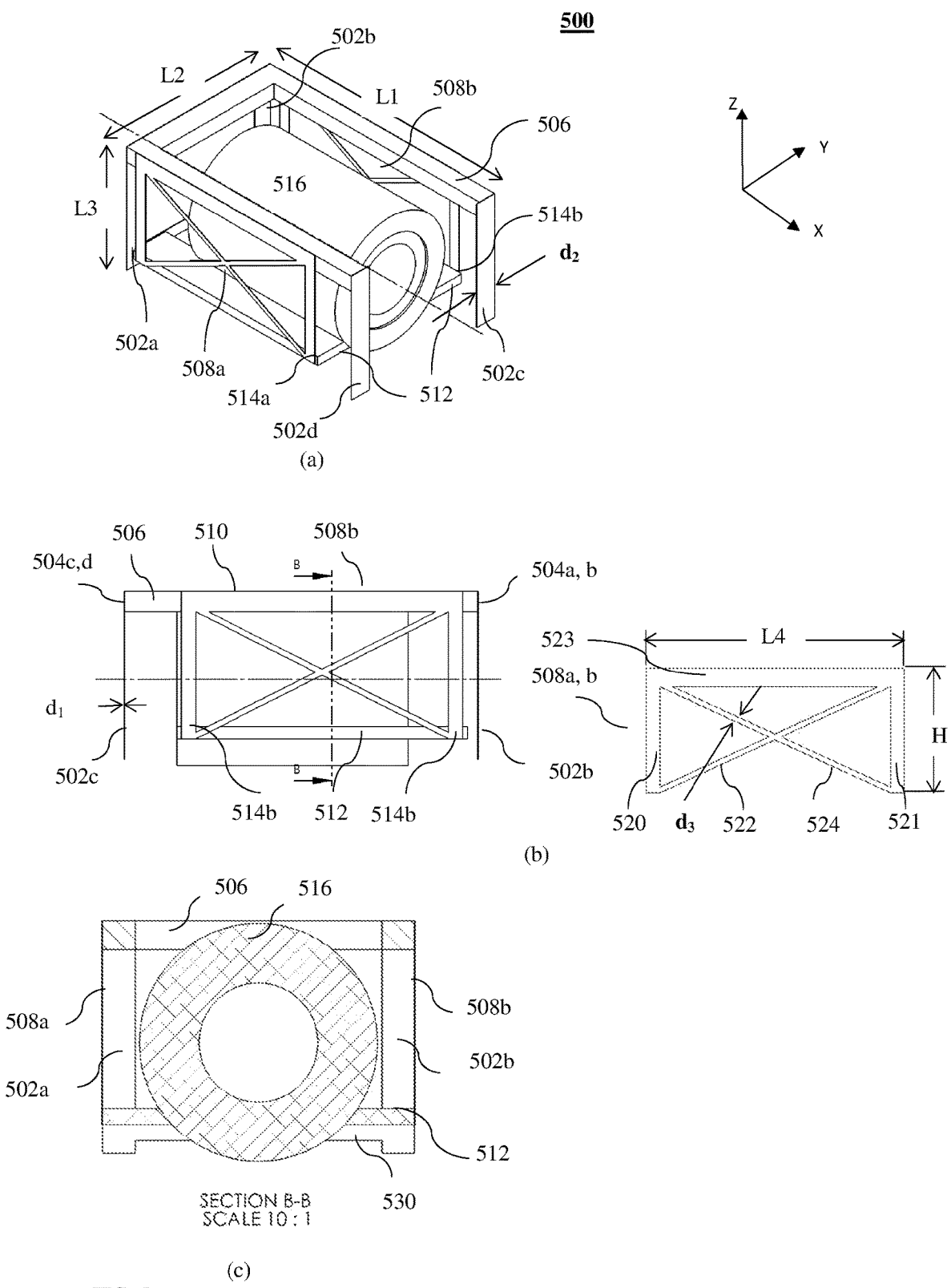
FIG. 5 shows an exemplary embodiment of an OIS and AF support structure disclosed herein in a folded optics camera module in (a) an isometric view, (b) side view and (c) radial cross section.

FIG. 5 shows an exemplary embodiment of a folded lens 500 held by a support structure numbered 502 in (a) an isometric view, (b) side view and (c) radial cross section. Exemplarily, support structure 502 may comprise four support spring members 502a-d, each spring member being essentially a thin leaf spring with high stiffness in one direction (e.g. Y) and low stiffness in a second direction (e.g. X) perpendicular to the first direction. In this description, the term "high stiffness" used with reference to a spring structure refers to a spring structure having a natural frequency in the range of hundreds to thousands of Hertz, exemplarily between 200-4000 Hz. The term "low stiffness" used with reference to a spring structure refers to a spring structure having a natural frequency in the range of tens of Hertz, exemplarily between 30-100 Hz. In general, the natural frequency of a spring is proportional to the square root of its stiffness.

Henceforth, support spring members 502 are referred to as "leaf springs". Exemplarily, a leaf spring 502a-d has a length L3 of 4.8-5.5 mm and a rectangular cross section, with a small (exemplarily 20-60 µm) thickness $d_1$ in the flexing direction (here X) and with a significantly larger (exemplarily 0.5-1 mm) width $d_2$ in the non-flexing direction (here Y). The structure and mechanical properties of the leaf springs allows only movement for AF in the X direction. Each leaf spring is rigidly connected at a respective upper end 504a-d to a rigid upper frame 506 and at a respective bottom end to a base such as base 310. Leaf springs 502a and 502b may optionally be connected at a bottom end by a bar 530. Support structure 502—further comprises two support springs 508a and 508b coupled rigidly to frame 506 at an upper end 510 and to a lens support plate 512 at a lower end (respectively 514a and 514b). Support springs 508a and 508b are designed to have low stiffness in the Y direction for OIS movement, and high stiffness in the X direction, while not adding significantly to the camera module width. Exemplarily and as shown separately, springs 508a or 508b include two leaf spring members 520 and 521 connected by two diagonal leaf spring members 522 and 524. The leaf springs and diagonal springs are connected at an upper end to a member 523. Hereinafter, a support spring such as a spring 508 is referred to as "cross spring". Exemplarily, a diagonal leaf spring member has a rectangular cross section with a thickness of the same order of that of a leaf spring 502a (exemplarily 20-60 µm) and a width $d_3$ of about 0.2 mm. Exemplarily, a cross spring 508a or 508b may have a length dimension L4 in the range of 7-10 mm and a height H in the range of 4-5 mm. Exemplarily in an embodiment, L4 is approximately 9.5 mm and H is approximately 4.6 mm. Optionally or alternatively, leaf springs 502a and 502b may be replaced by a cross spring 508a or 508b, with care being taken (if necessary) not to obstruct an optical path. In yet another alternative embodiment, a cross spring 508a or 508b may also replace leaf springs 502c and 502d, with care being taken (if necessary) not to obstruct an optical path.

Frame 506 may exemplarily be made of a plastic material such as LCP (VECTRA® E525T). Plate 512 is rigidly connected to a lens 516 (or to a lens carrier carrying the lens). In this embodiment, upper frame 506 has a U-shape so as not to block an optical path to a path-folding optical element (e.g. mirror or prism, not shown). Exemplarily, frame 506 has dimensions of $L_1$=11.9 mm and $L_2$=7.6 mm. More generally, the ratio $L_2/L_1$ can be between 0.5-0.7.

Figure 1:
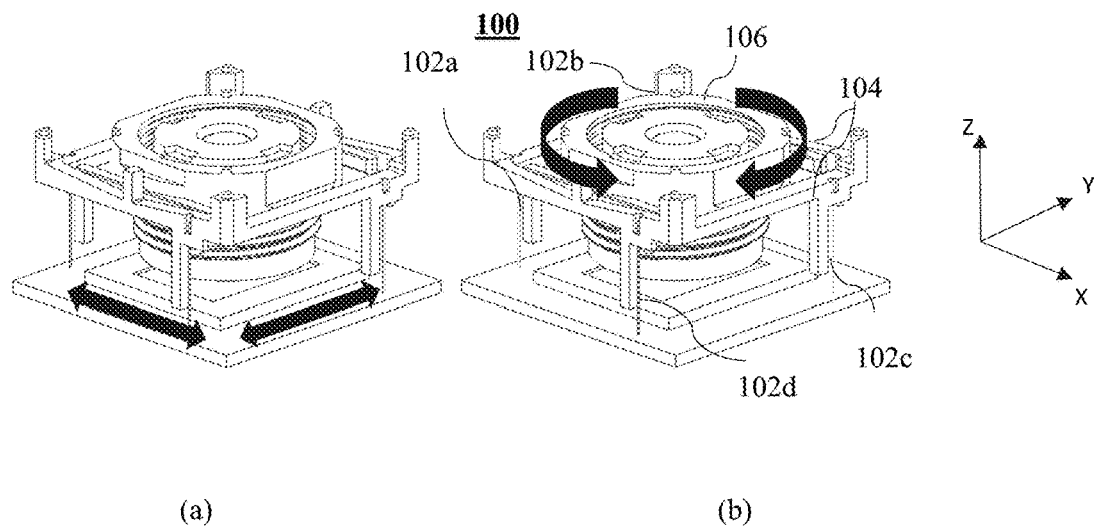
FIG. 1 shows a camera module with an exemplary classical four rod-springs OIS structure: (a) modes of wanted X-Y translations, and (b) mode of unwanted rotation around the Z axis.
Figure 2:
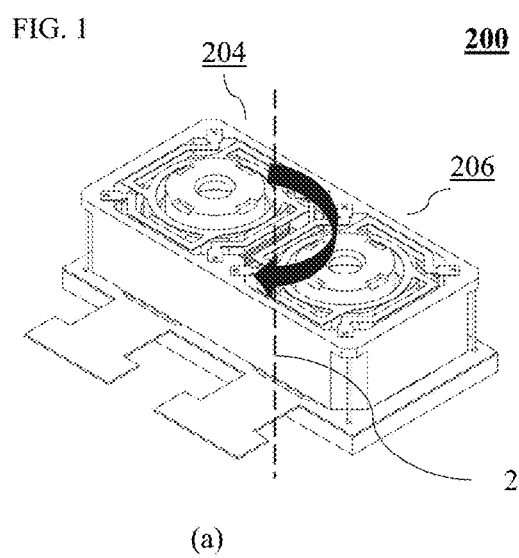
FIG. 2 shows a dual-aperture camera: (a) rotation mode around an axis roughly centered between two camera modules, and (b) movement of each lens in undesired directions.
Figure 3:
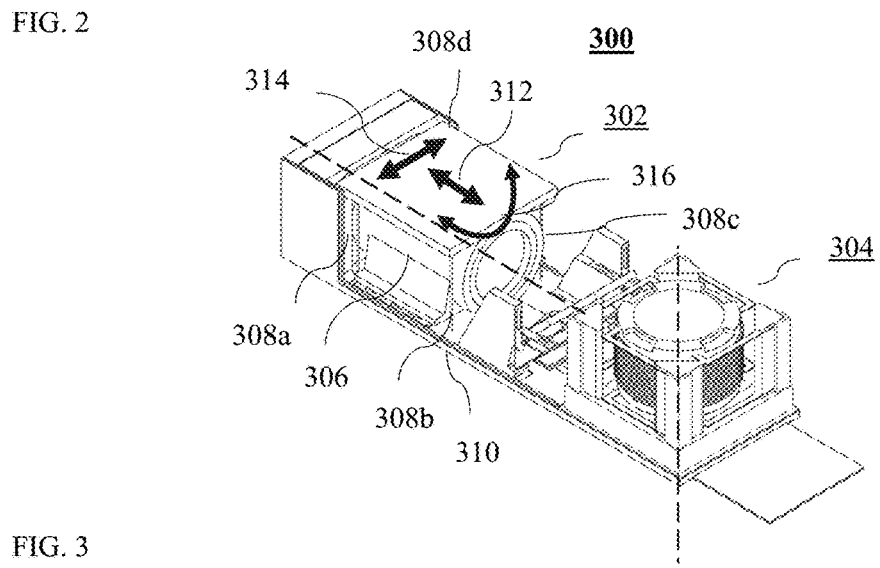
FIG. 3 shows a dual-camera module with a folded optics camera module.
Figure 4:
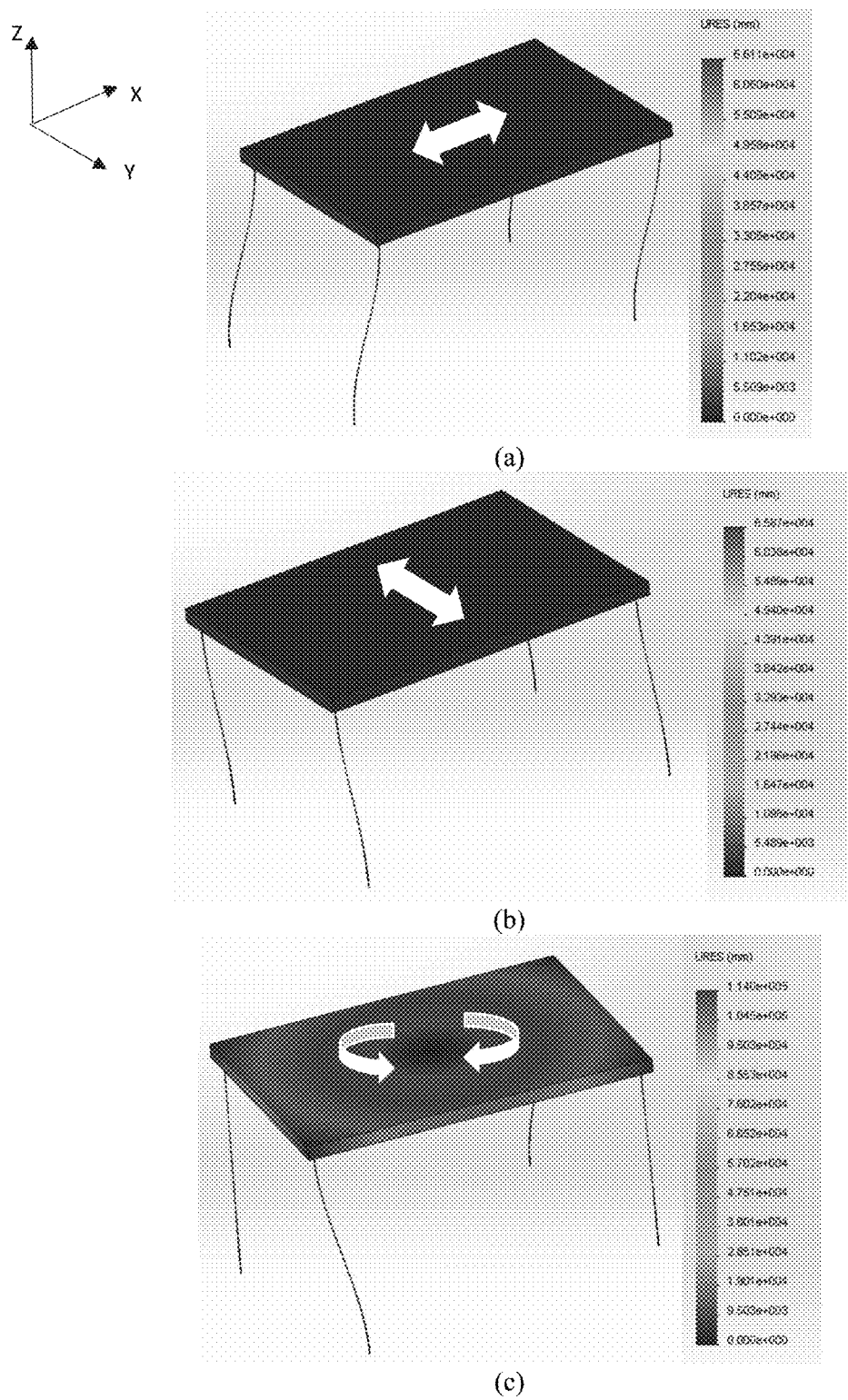
FIG. 4 show the simulated behavior of a standard rigid plate supported by four round rod-spring poles: (a) movement in the X-direction, (b) movement in the Y direction and (c) tilt around a rotation axis.
Figure 6:
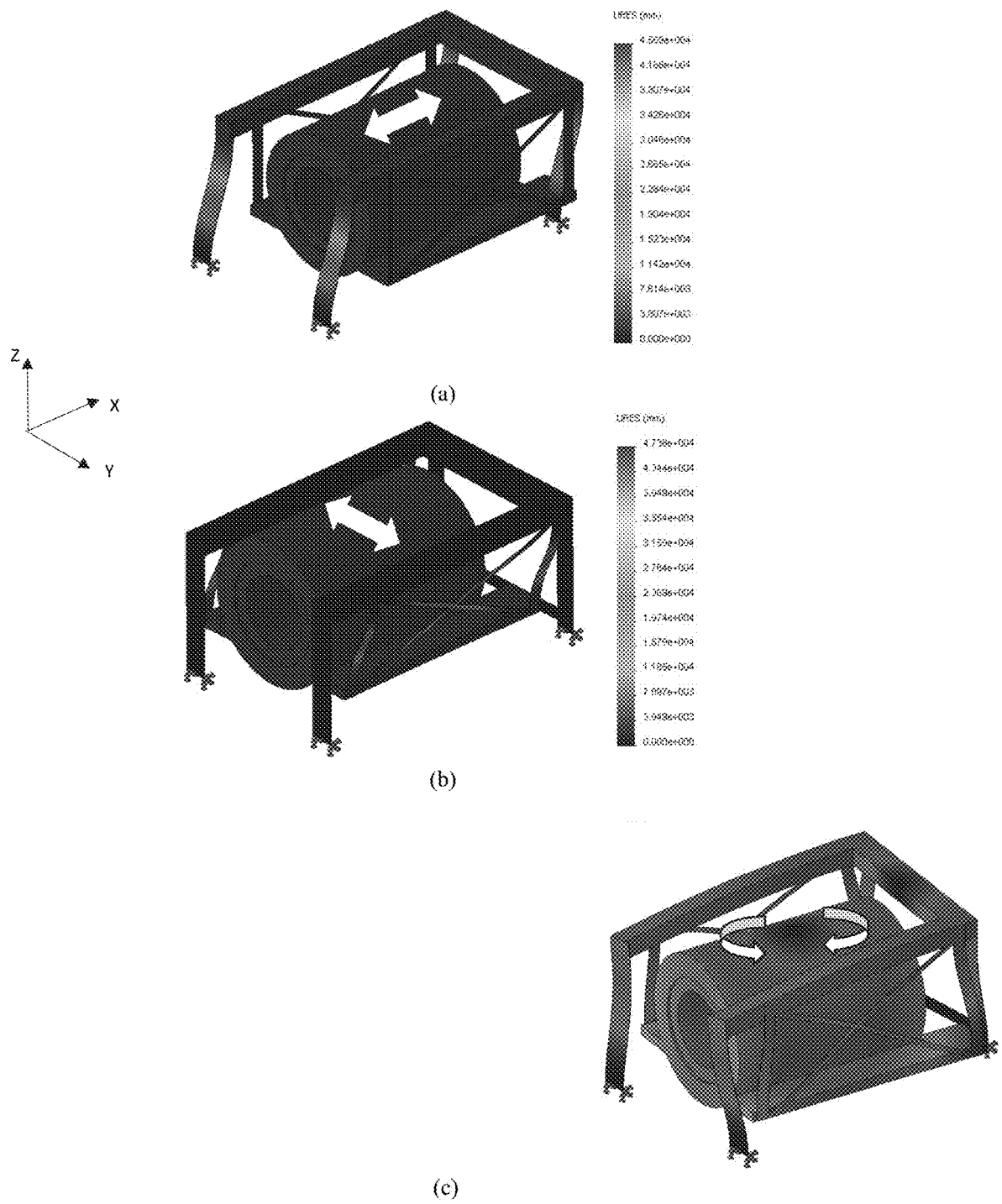
FIG. 6 shows the simulated behavior of the support structure of FIG. 5 for (a) movement in the X-direction, (b) movement in the Y direction and (c) tilt around a rotation axis.

FIG. 6 shows the first three modes of the support structure of FIG. 5 resulting from modal Finite Element Analysis where: (a) describes a mode of movement in the X-direction for AF, (b) describes a mode of movement in the Y direction for OIS and (c) describes a mode of (unwanted) tilt around a rotation axis like movement 316 thin FIG. 3. The arrows show schematically the different movements. In use for AF, the lens and upper frame 506 is actuated to move in the X direction while flexing springs 502. Movement in the Y direction and unwanted rotation such a rotation 316 around the Z-axis in FIG. 3 are minimal. For OIS, lens movement in the Y direction is allowed by the flexing of cross springs 508a or 508b (see also FIG. 6b), while movement in the X direction and unwanted rotation around the Z-axis are again minimal. Specifically, the normalized (relative to a first frequency which in this exemplary case is of 40 Hz) natural frequencies for X and Y translations are of the same order (specifically 1 in (a) and 1.2 in (b)), whilst the natural frequency for rotation (c) has a relative value of 29.3. That is, the natural frequency in FIG. 6c is of a significantly higher order than that in FIGS. 6a and 6b. Advantageously, the arrangement of separate leaf springs (flexible in the X-direction) and cross springs (flexible in the Y direction) prevents unwanted rotation motion around the Z-axis.

In an embodiment and exemplarily, the springs are made of a copper-nickel-tin mx-215 alloy with an elastic modulus of 125 GPa. In other exemplary embodiments, the springs may be made of some other metal alloy or of a non-metal, for example of polymer or plastic material, a composite material or a combination of metal/ceramic and/or plastic materials, chosen such that the dimensions and elastic properties fit the camera form requirements.

Figure 7:
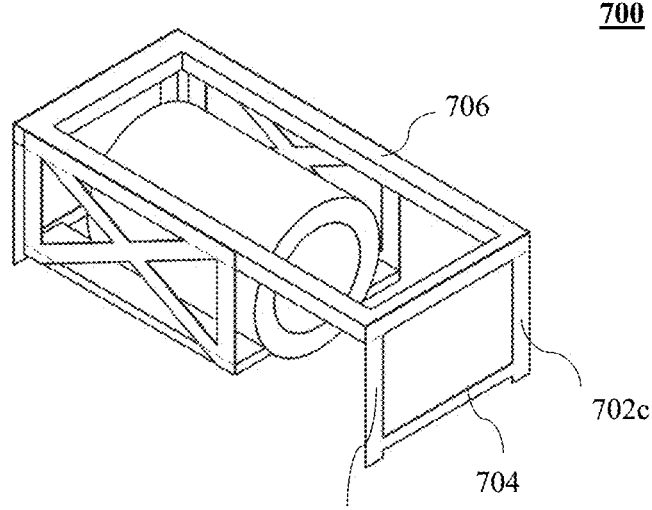
FIG. 7 shows an isometric view of another exemplary embodiment of an OIS and AF support structure in a folded optics camera module.

FIG. 7 shows an isometric view of another exemplary embodiment of a support structure in a folded optics camera 700. Here, an upper frame 706 is closed and leaf springs 702c and 702d are connected at the bottom by a bar 704, imparting added stiffness in the Y direction. Alternatively, the leaf springs and bar may be replaced by a cross spring. The frame is closed behind the optical path folding element (prism or mirror) so there is no problem of disturbing the optical path to this element. In yet another embodiment shown in FIG. 9, an upper frame 906 has a closed rectangular shape strengthened by two cross bar members 906a and 906b.

Figure 8:
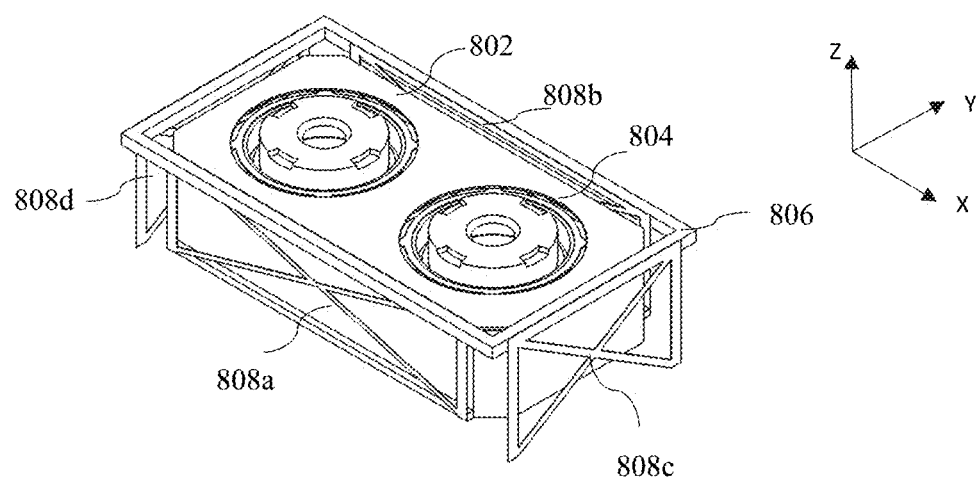
FIG. 8 shows an isometric view of an exemplary embodiment of a dual-aperture camera with two camera modules held by a support structure disclosed herein.

FIG. 8 shows an isometric view of an exemplary embodiment of a dual-aperture camera 800 with two camera modules 802 and 804 held by a support structure disclosed herein. An upper frame 806 is closed like frame 706 in FIG. 7, while the support structure is comprised of cross springs 808a-d. Here, the support structure is designed for OIS in two directions—X and Y.

Figure 9:
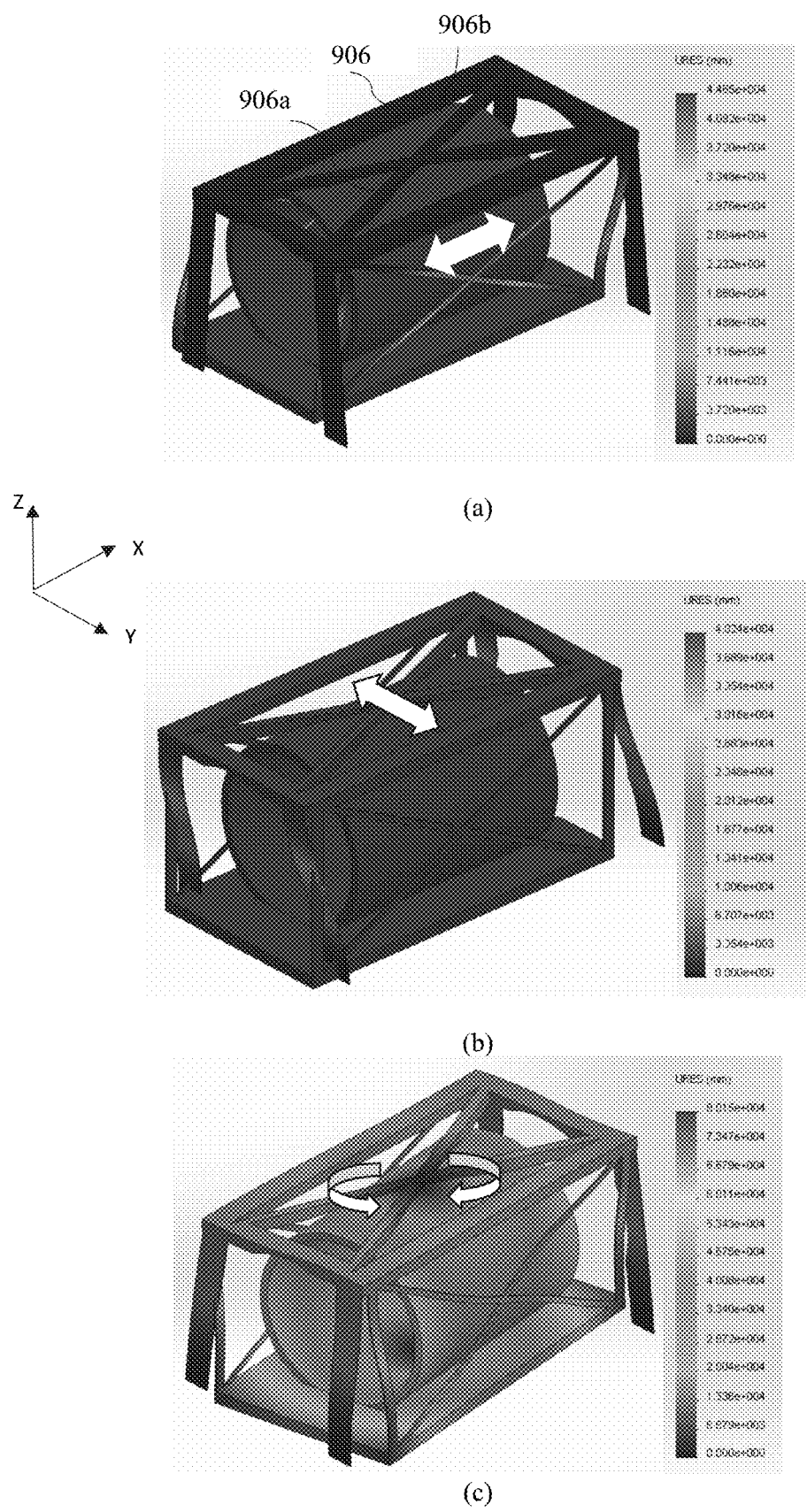
FIG. 9 shows the simulated behavior of another exemplary embodiment of a support structure in a folded optics camera module for (a) movement in the X-direction, (b) movement in the Y direction and (c) tilt around a rotation axis.

FIG. 9 shows the first three modes of another exemplary embodiment of a support structure in a folded optics camera module, as resulting from modal simulation, where: (a) describes a mode of movement in the X-direction for AF, (b) describes a mode of movement in the Y direction for OIS and (c) describes a mode of (unwanted) tilt around a rotation axis. The arrows show schematically the different movements. The first frequency is 100 Hz, and the normalized natural frequencies for X and Y translations are of the same order (specifically 1 in (a) and 1.2 in (b)), whilst the natural frequency for torsion (c) has a relative value of 23.9.

Figure 10A:
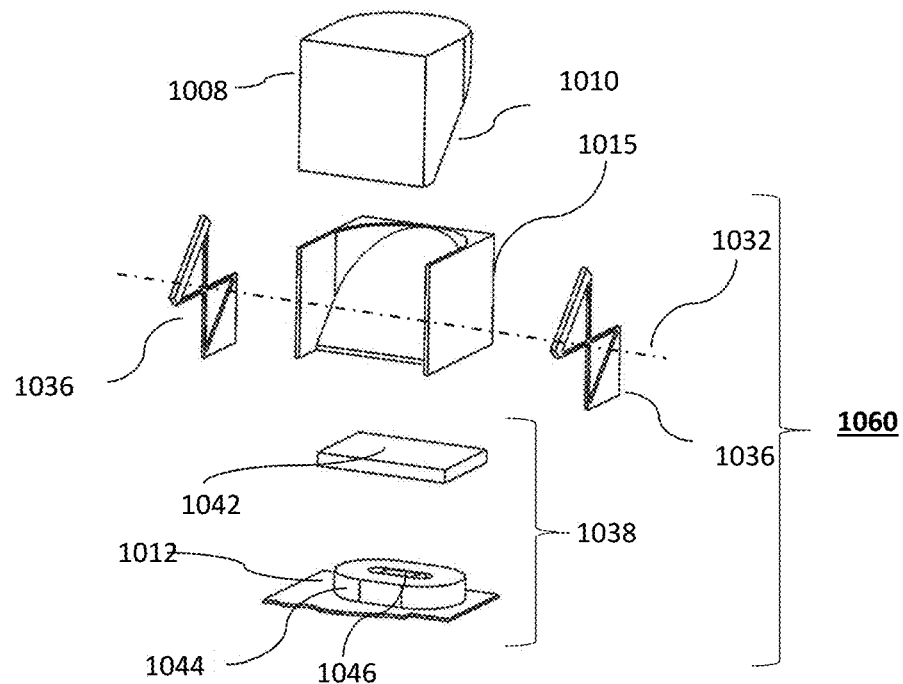
FIG. 10A shows an exploded isometric view of an embodiment of an optical path folding element (OPFE) actuation sub-assembly, in which the OPFE in the form of a prism, according to an example of the presently disclosed subject matter.

FIG. 10A shows an exploded isometric view of an optical path folding element (OPFE) 1o actuation sub-assembly 1060, according to an example of the presently disclosed subject matter. The OPFE may be for example a prism (e g. 1008 in FIG. 10A) or a mirror (e.g. 1008 in FIG. 10C). According to the illustrated example, OPFE actuation sub-assembly 1060 includes hinge springs 1036a-b that suspend the prism and can convert linear to angular motion. These hinge springs allow tilting of prism 1008 around a hinge axis 1032, which is parallel to, or along the Y axis. The tilt can be for example ±1° from a zero (rest) position of the prism.

Figure 10B:
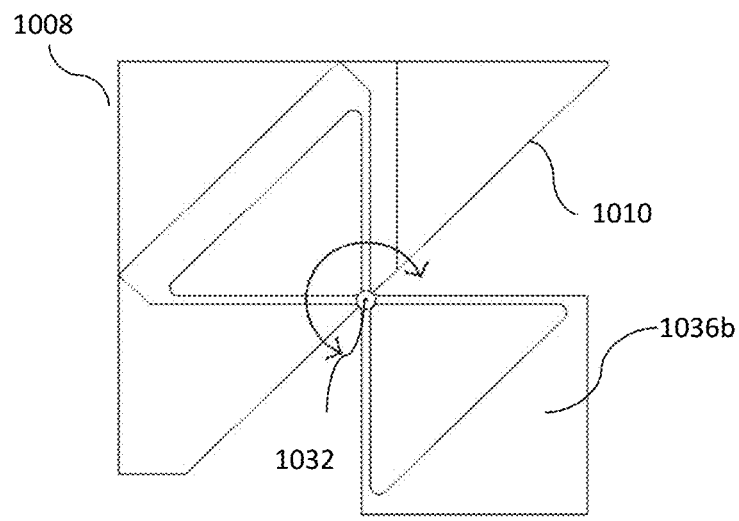
FIG. 10B shows a side view of part of the OPFE actuation sub-assembly of FIG. 10A, according to an example of the presently disclosed subject matter.

In the embodiment shown in FIG. 10A, the hinge springs may be in the form of single-part flexible supports 1036a and 1036b, each attached at a side of the prism. The prism and its reflecting surface plane 1010, hinge axis 1032 and flexible support 1036b are also shown in a side view in FIG. 10B. Actuation sub-assembly 1060 further includes an actuator 1038 that includes a magnet 1042 rigidly coupled to prism 1008 (in the illustrated example—through an adaptor 1015) and a coil 1044 rigidly coupled to base 1012.

Figure 10C:
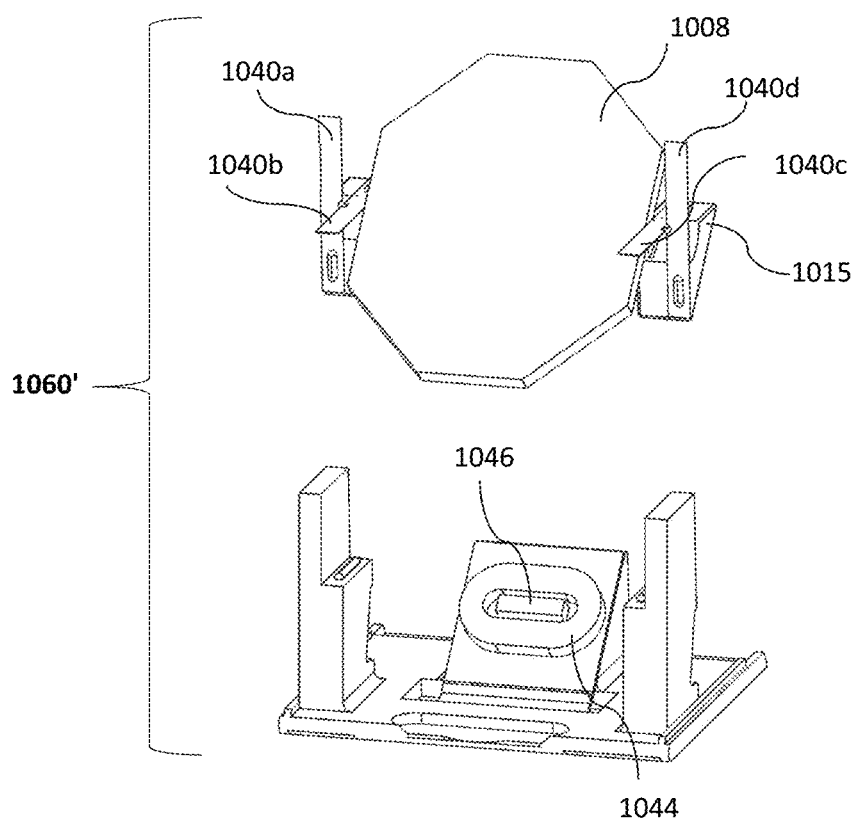
FIG. 10C shows an isometric exploded view of an OPFE actuation sub-assembly, in which the OPFE is in the form of a mirror, according to an example of the presently disclosed subject matter.
Figure 10D:
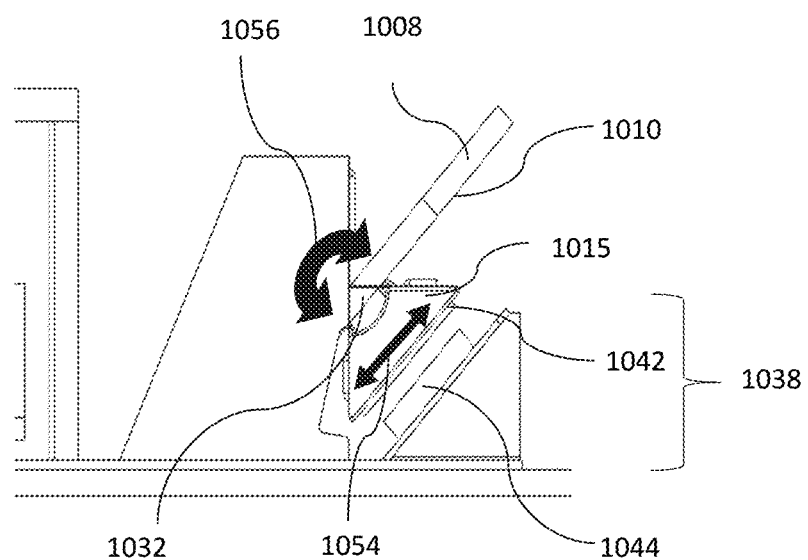
FIG. 10D shows a side view of part of the OPFE actuation sub-assembly of FIG. 10C, according to an example of the presently disclosed subject matter.
Figure 10E:
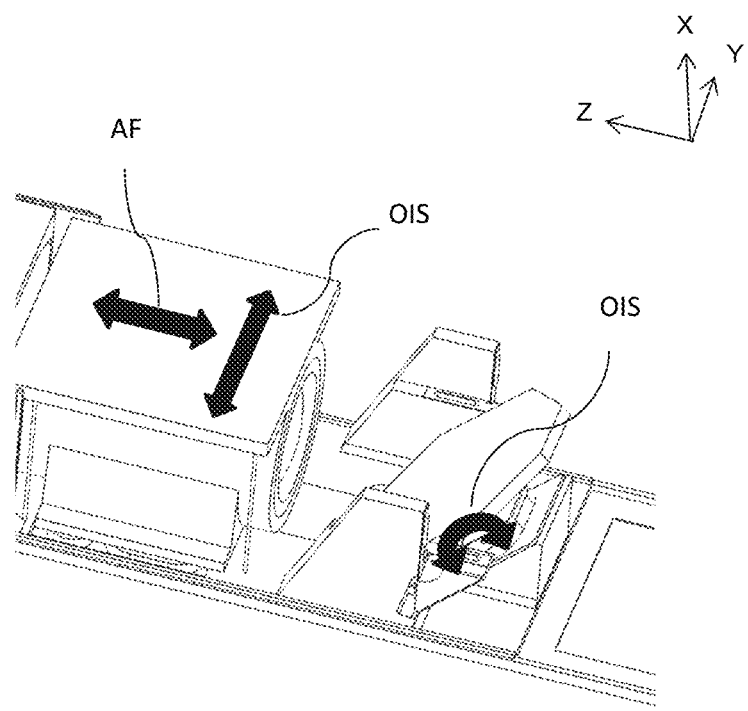
FIG. 10E shows schematically the AF and OIS movements of the lens module and the OIS tilt movement of the OPFE, according to an example of the presently disclosed subject matter.

Regarding a hinge spring, it can be designed in at least two different ways. In one design, mentioned and shown in FIGS. 10A and 10B, the hinge spring may comprise two single-part flexible supports 1036a and 1036b attached at each side of the prism. Another design is illustrated in FIGS. 10C and 10D. FIG. 10C shows an isometric exploded view of another embodiment of an OPFE actuation sub-assembly 1060', in which the OPFE is in the form of a mirror 1008. FIG. 10D shows actuation sub-assembly 1060' assembled, in a side view. Actuation sub-assembly 1060' includes a hinge spring having two sets of leaf springs mounted at each side of the mirror, a first set having two spring members 1040a and 1040b perpendicular to each other and a second set having two spring members 1040c and 1040d perpendicular to each other. The rotation axis will be around a virtual line drawn between the intersection points of each springs set 1040a-b and 1040c-d. FIG. 10E shows schematically the AF and OIS movements of the lens module and the OIS tilt movement of the OPFE.

The hinge spring of any of the embodiments presented may convert force in any direction parallel to the X-Z plane to a torque around the Y axis such that tilt around the Y axis is created.

As described with reference to FIGS. 10C and 10D and further below, in operation, a Lorentz force may be applied between coil 1044 and magnet 1042 in order to move magnet 1042 in a direction indicated by an arrow 1054 (FIG. 10D). This force (and magnet movement) is then converted by the hinge to a tilt motion around the Y axis indicated by an arrow 1056 (FIG. 10D). The motion is measured by a Hall-bar sensor 1046.

Figure 11:
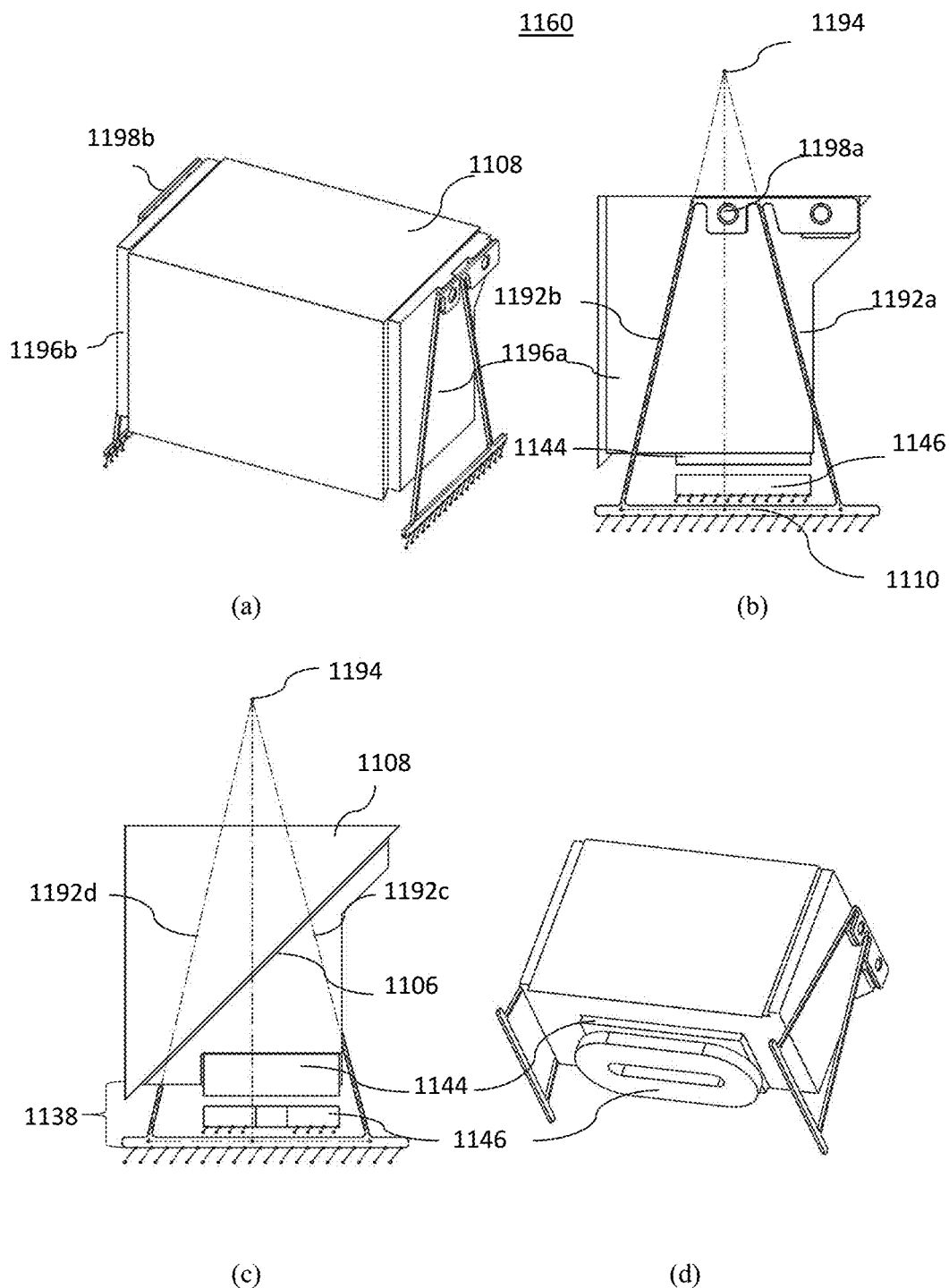
FIG. 11 shows various views of another embodiment of an OPFE actuation sub-assembly, in which the OPFE in the form of a prism, according to an example of the presently disclosed subject matter. (a) perspective view, (b) external side view, (c) internal side view and (d) bottom perspective view.

FIG. 11 shows various views of another embodiment of an OPFE actuation sub-assembly, numbered 1160, in which the OPFE is in the form of a prism 1108 with a reflecting surface 1106, according to an example of the presently disclosed subject matter: (a) perspective view, (b) external side view, (c) internal side view and (d) bottom perspective view.

OPFE actuation sub-assembly 1160 comprises a hanging structure that includes four flexible hanging members 1192a-d that hang prism 1108 over a base 1110. Flexible hanging members 1192a-d are similar to flexible hanging members 308a-d, except that instead of being parallel they are tilted. They are therefore referred to as "tilted hanging members". Tilted hanging members 1192a-d are fixedly mounted on base 1110 at one respective member end and attached to the prism at another member end through hinge points 1198a and 1198b and through side panels 1196a and 1196h. In particular, tilted hanging members 1192a and 1192b are attached through hinge point 1198a to side panel 1196a and tilted hanging members 1192c and 1192d are attached through hinge point 1198b to side panel 1196b. The side panels are fixedly coupled to opposite sides of the prism. Tilted hanging embers 1192a-d allow tilting of prism 1108 around a (virtual) hinge axis 1194, which is parallel to, or along the Y axis. Actuation sub-assembly 1190 further includes an actuator 1138 that includes a magnet 1144 rigidly coupled to prism 1108 and a coil 1146 rigidly coupled to base 1110. This actuator serves in a similar capacity as the actuator comprising magnet 1044 and coil 1046 in actuator 1038 above.

In operation, a Lorentz force may be applied between coil 1144 and magnet 1146 to move magnet 1146 either to the left or to the right (e.g. in FIG. 11(b)). This force (and magnet movement) is then converted by the tilted hanging members to a tilt ("pendulum") motion around axis 1194. The tilt may be typically ±1° from a zero (rest) position of the prism. The motion is measured by a Hall-bar (not shown) as explained above. Such an embodiment allows increase in the Hall-bar sensitivity to tilt actuation, by increasing the relative motion between magnet 1144 and the Hall-bar.

In summary, the performance of the support structures provided herein in terms of avoidance of unwanted linear movement and rotation (torsion) while performing AF and OIS is much superior to that of any known support structure used for the same purposes.

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

What is claimed is:

1. A folded camera module, comprising:
a) a lens module having a lens optical axis,
b) an optical path folding element (OPFE) for folding light from a first optical path to a second optical path towards an image sensor, the second optical path being along the lens optical axis;
c) a lens actuation sub-assembly configured to actuate the lens module to be moved for auto-focus (AF) along a first direction substantially parallel to the second optical path and to be moved for optical image stabilization (OIS) along a second direction substantially orthogonal to both the first and second optical paths to compensate for tilt of the folded camera module around the first direction; and d) an OPFE actuation sub-assembly configured to tilt the OPFE for OIS around an OPFE tilt axis which is parallel to the second direction to compensate for tilt of the folded camera module around the second direction, wherein the lens actuation sub-assembly comprises a plurality of springs mechanically coupled to a lens support plate carrying the lens module, wherein the plurality of springs provides overall low stiffness to movement of the lens module in the first and second directions and high stiffness of the lens module to torsion, such that a ratio between natural frequencies arising from the high stiffness to torsion and the low stiffness to movement in each of the first and second directions is greater than 2.

2. The folded camera module of claim 1, wherein the ratio between natural frequencies arising from the high stiffness to torsion and the low stiffness to movement in each of the first and second directions is greater than 3.

3. The folded camera module of claim 1, wherein the ratio between natural frequencies arising from the high stiffness to torsion and the low stiffness to movement in each of the first and second directions is greater than 5.

4. The folded camera module of claim 1, wherein the ratio between natural frequencies arising from the high stiffness to torsion and the low stiffness to movement in each of the first and second directions is greater than 10.

5. The folded camera module of claim 1, wherein the lens actuation sub-assembly is dimensioned to accommodate the lens module without obstructing an optical path passing through the lens module.

6. The folded camera module of claim 1, further comprising one or more position sensors that enable measurement of a position of the lens module along the first and second directions and measurement of the OPFE tilt.

7. The folded camera module of claim 6, wherein the position sensors are Hall sensors.

8. The folded camera module of claim 1, wherein the OPFE actuation sub-assembly includes a plurality of flexible hanging members.

9. The folded camera module of claim 1, wherein the OPFE tilt axis is a virtual axis.

10. The folded camera module of claim 1, wherein the OPFE actuation sub-assembly includes at least one coil-magnet pair for actuating the OPFE tilt.

11. The folded camera module of claim 1, wherein the OPFE includes a prism or a mirror.

12. The folded camera module of claim 1, wherein the lens actuation sub-assembly includes a plurality of coil-magnet pairs for actuating the lens module movement.

13. The folded camera module of claim 12, wherein the plurality of coil-magnet pairs includes two coil-magnet pairs.

14. The folded camera module of claim 1, wherein the folded camera module has a folded camera height in the range of 4-7 mm and wherein the lens module has an effective focal length $EFL_F$ in the range of 6-15 mm.

15. The folded camera module of claim 1, included in a smart-phone.

* * * * *